(12) United States Patent
White et al.

(10) Patent No.: US 11,700,298 B2
(45) Date of Patent: Jul. 11, 2023

(54) MULTI-ACCESS EDGE COMPUTING LOW LATENCY INFORMATION SERVICES

(71) Applicant: Verizon Patent and Licensing Inc., Arlington, VA (US)

(72) Inventors: Brian Matthew White, Port Murray, NJ (US); Ning Zhang, Warren, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 438 days.

(21) Appl. No.: 16/690,405

(22) Filed: Nov. 21, 2019

(65) Prior Publication Data

US 2021/0160304 A1    May 27, 2021

(51) Int. Cl.
*H04L 67/04* (2022.01)
*H04L 67/1023* (2022.01)
*H04L 67/101* (2022.01)
*H04L 41/5019* (2022.01)
*H04W 4/50* (2018.01)
*H04W 28/24* (2009.01)
*H04L 67/1008* (2022.01)

(52) U.S. Cl.
CPC .......... *H04L 67/04* (2013.01); *H04L 41/5019* (2013.01); *H04L 67/101* (2013.01); *H04L 67/1008* (2013.01); *H04L 67/1023* (2013.01); *H04W 4/50* (2018.02); *H04W 28/24* (2013.01)

(58) Field of Classification Search
CPC ......... H04L 45/563; H04L 67/10; H04W 4/60
See application file for complete search history.

(56) References Cited

U.S. PATENT DOCUMENTS

| | | | |
|---|---|---|---|
| 2016/0019547 A1* | 1/2016 | Gurnani | G06Q 20/3223 705/44 |
| 2016/0359947 A1* | 12/2016 | Rao | H04L 67/025 |
| 2017/0331823 A1* | 11/2017 | Batchu | H04L 63/102 |
| 2018/0310150 A1* | 10/2018 | Cuevas Ramirez | G06F 8/65 |
| 2019/0138934 A1* | 5/2019 | Prakash | G06F 9/5072 |
| 2019/0319868 A1* | 10/2019 | Svennebring | H04W 24/08 |
| 2020/0229206 A1* | 7/2020 | Badic | H04W 16/32 |
| 2020/0302431 A1* | 9/2020 | Polehn | H04L 9/3239 |
| 2020/0389531 A1* | 12/2020 | Lee | H04L 67/2804 |

* cited by examiner

*Primary Examiner* — Nicholas R Taylor
*Assistant Examiner* — Sm Z Islam (57) ABSTRACT

A multi-access edge computing (MEC) platform may receive an indication that a user device has downloaded a MEC application client associated with a MEC application and may send, to the user device, instructions to install a device client. The device client may transmit device information associated with the user device to the MEC platform. The MEC platform may receive the device information associated with the user device and determine, based on the received device information, performance information associated with the MEC application.

20 Claims, 5 Drawing Sheets

ID
MULTI-ACCESS EDGE COMPUTING LOW LATENCY INFORMATION SERVICES

BACKGROUND

Multi-Access Edge Computing (MEC) is a technology that is developing to meet the needs and demands of applications requiring, amongst other things, low latency and the ability to offload computing resources. In order to support low latency, information about devices accessing a MEC platform must be constantly retrieved in order to optimize services for the devices. Due to the large amount of the information needed and the necessity to constantly update the information, it may be difficult to query the information in a way that provides useful information for MEC to optimize the services.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

MEC technology may offer high speed, low latency computing for a variety of industries including health care, telematics (e.g., autonomous vehicles), gaming, entertainment (e.g., virtual reality, augmented reality, etc.), industry automation, Internet of Things (IoT), computer vision, etc. MEC technology may deliver high throughput, low latency network services for demanding applications and use cases.

In order to support low latency, information about users, user devices, user locations, and user network resources may be constantly retrieved and available as data for the MEC platform to ingest in order to make decisions about how MEC applications function. As an example, if one virtual instance of a MEC application begins to slow in response to a number of users exceeding the computing resources, the MEC may dynamically assign users to a new instance of the application. In order to perform these actions dynamically and proactively, the MEC must have access to the current user base and their locations and network information.

Another issue affecting user experience may be user mobility. If a user moves to the edge of cellular coverage or is moving closer to another region where another MEC platform would better service the user's MEC application, information from the network may be used to make decisions regarding the user's MEC service prior to the user experiencing any decrease in performance. In this situation, receiving real-time or near real-time information about the user and the user's location may help the network to optimize performance. For example, based on the user location, the MEC platform servicing the user device may be switched to a closer MEC platform before the user experiences any degradation in Quality of Service (QoS) and application performance.

Wireless communication networks may not have access to detailed radio and network level information in real time. Currently, data that is collected from devices and network elements may be normalized and stored in a centralized data repository in a cloud or on a data network associated with a network provider. Due to the quantity and size of the device information collected and the need to constantly update the information, it may take a long time for the MEC to extract necessary information from the data repository. The long latency may make it impossible for the MEC to query the information in a way that will provide useful information for the MEC and real time use cases. In order to modify MEC behaviors dynamically and scale to the demands of the MEC applications, the information may need to be available in real time or near real time. Given the way that data is currently collected, it may be impossible for the MEC to receive useful radio and network level information in a timely manner.

Systems and methods described herein may allow devices to send device information directly to the MEC. In this way, the MEC may be able to access the device network information in real time instead of retrieving the information from a data repository on the cloud or a provider's data network. Implementations described herein may enable devices that are registered to utilize a MEC application to send diagnostic information and device data directly to the MEC once the MEC application is instantiated on the devices. The diagnostic information and device data may be stored locally in a data repository on the MEC and used to optimize the performance of MEC applications. The diagnostic data and device network information stored on the MEC may be used to manage services on the MEC, provide better performance to users, optimize existing service, and/or create new services.

Figure 1:
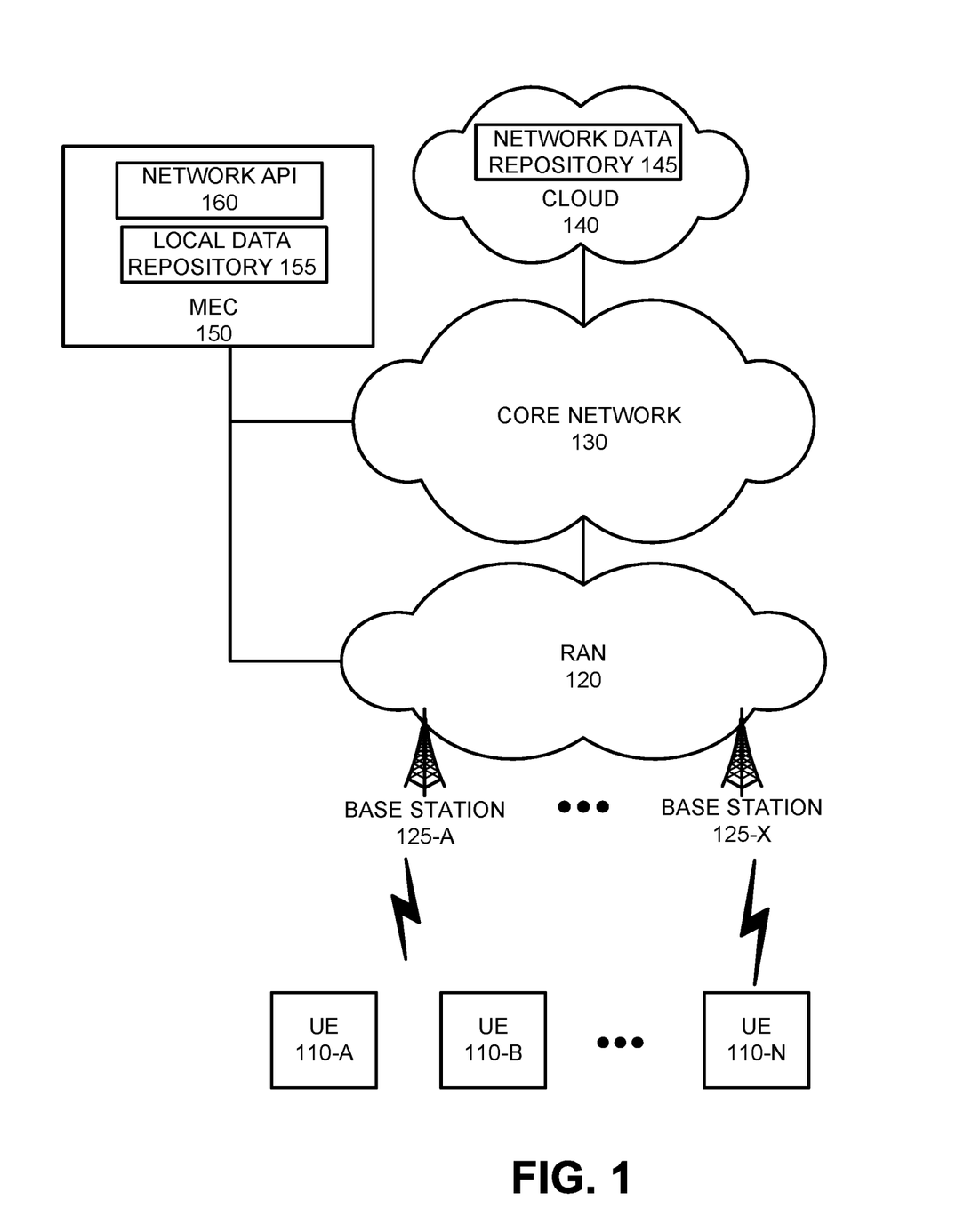
FIG. 1 is a diagram illustrating an exemplary environment in which systems and/or methods, described herein, may be implemented.

FIG. 1 is a diagram of an exemplary environment 100 in which the systems and/or methods, described herein, may be implemented. As shown in FIG. 1, environment 100 may include user equipment (UE) devices 110-A to 110-N (referred to herein collectively as "UE 110" and individually as "UE 110"), a radio access network (RAN) 120, a core network 130, a cloud platform 140, and a MEC platform 150.

UE 110 may include any device with long-range (e.g., cellular or mobile wireless network) wireless communication functionality. For example, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE 110 may include capabilities for voice communication, mobile broadband services (e.g., video streaming, real-time gaming, premium Internet access etc.), best effort data traffic, and/or other types of applications. UE 110 may also be referred to herein as a user device.

Radio access network (RAN) 120 may enable UEs 110 to connect to core network 130 for mobile telephone service, Short Message Service (SMS) message service, Multimedia Message Service (MMS) message service, Internet access, cloud computing, and/or other types of data services. RAN 120 may include base stations 125-A to 125-X (referred to herein collectively as "base stations 125" and individually as "base station 125"). Each base station 125 may service a set of UEs 110. For example, base station 125-A may service UEs 110-A and 110-B and base station 125-X may service UE 110-N. In other words, UEs 110-A to 110-B may be located within the geographic area serviced by base station 125-A, and other UEs 110 may be serviced by another base station 125.

Base station 125 may include a 5G base station (e.g., a next generation NodeB (gNodeB)) that includes one or more radio frequency (RF) transceivers (also referred to as "cells" and/or "base station sectors") facing particular directions. For example, base station 125 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110, and may simultaneously generate up to k antenna beams. A particular antenna beam may service multiple UEs 110. According to another implementation, base station 125 may include a gNodeB with multiple distributed components, such as a centralized unit (CU), a distributed unit (DU), a remote unit (RU or a remote radio unit (RRU)), or another type of distributed arrangement. In some implementations, base station 125 may also include a 4G base station (e.g., an extended NodeB (eNodeB)). Furthermore, in some implementations, base station 125 may include a MEC system that performs cloud computing and/or network processing services for UEs 110.

Core network 130 may manage communication sessions for UEs 110. For example, core network 130 may establish an Internet Protocol (IP) connection between UE 110 and cloud platform 140 or MEC platform 150. Furthermore, core network 130 may enable UE 110 to communicate with an application server, and/or another type of device, using a communication method that does not require the establishment of an IP connection.

In some implementations, core network 130 may include a Long Term Evolution (LTE) access network (e.g., an evolved packet core (EPC) network). In other implementations, core network 130 may include a Code Division Multiple Access (CDMA) access network. For example, the CDMA access network may include a CDMA enhanced High Rate Packet Data (eHRPD) network (which may provide access to an LTE access network).

Furthermore, core network 130 may include an LTE Advanced (LTE-A) access network and/or a 5G core network or other advanced network that includes functionality such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Cloud platform 140 (hereinafter cloud 140) may store data associated with a telecommunications network. According to an implementation, cloud 140 may host different application services used by UEs 110. Cloud 140 may include network data repository 145. Network data repository 145 may store data associated with UEs 110, such as diagnostics, network data, and radio network information services data. According to an implementation described herein, network data repository 145 may store device data for use by MEC 150 for optimizing services for UEs 110.

MEC platform 150 (referred to herein as MEC 150) may include a 5G MEC network architecture that enables cloud computing capabilities and an Information Technology (IT) service environment at the edge of a cellular network, such as core network 130. EC technology may be designed to be implemented at cellular base stations or other edge nodes and may enable flexible and rapid deployment of new applications and services for customers. By running applications and performing related processing tasks closer to the cellular customer, network congestion may be reduced and application performance may improve. MEC 150 may include local data repository 155 for storing diagnostics or network data associated with UEs 110 that are running a MEC application. MEC 150 may additionally include a network application programming interface (API) 160. Network API 160 may include a collection of software functions and procedures, referred to as API calls, that can be executed by other software applications. Network API 160 may be used to gather device data for local data repository 155. In addition, network API 160 may be used by other applications or services for optimizing services based on the data stored in local data repository 155.

As used herein, the term "user" is intended to be broadly interpreted to include UE 110 and/or a person using UE 110. Also, the terms "user," "owner," "consumer," "subscriber," and/or "customer" are intended to be used interchangeably.

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. Also, in some implementations, one or more of the displayed devices or networks may perform one or more functions described as being performed by another one or more of the other devices or networks. The devices and networks shown in FIG. 1 may interconnect via wired connections, wireless connections, or a combination of wired and wireless connections.

Figure 2:
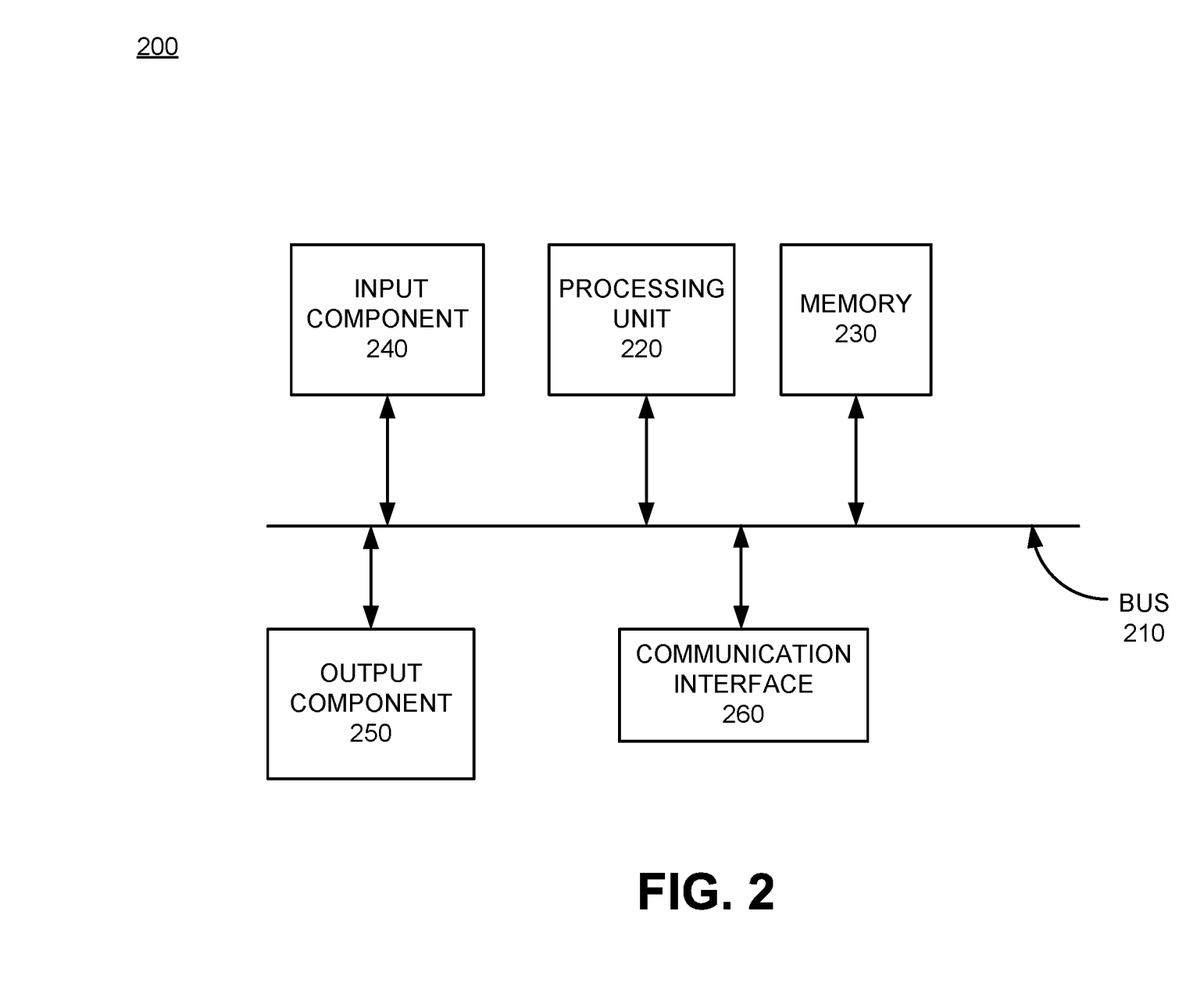
FIG. 2 is a diagram of exemplary components of a device that may be included in the environment shown in FIG. 1.

FIG. 2 is a diagram of exemplary components of a device 200 that may correspond to one of the components of UE 110, RAN 120, core network 130, cloud 140, and/or MEC 150. As illustrated, device 200 may include a bus 210, a processing unit 220, a memory 230, an input component 240, an output component 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a button, a switch, a keyboard, a keypad, a mouse, a microphone or the like. Output component 250 may include a device that outputs information to the operator, such as a display (e.g., a liquid crystal display), a printer, a speaker, a light emitting diode (LED), etc.

Communication interface 260 may include one or more transceivers that enables device 200 to communicate with other devices and/or systems. For example, communication interface 260 may include one or more radio frequency (RF) receivers, transmitters, and/or transceivers and or more antennas for transmitting and receiving data. Communication interface 260 may also include a modem or Ethernet interface to a LAN or other mechanism for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
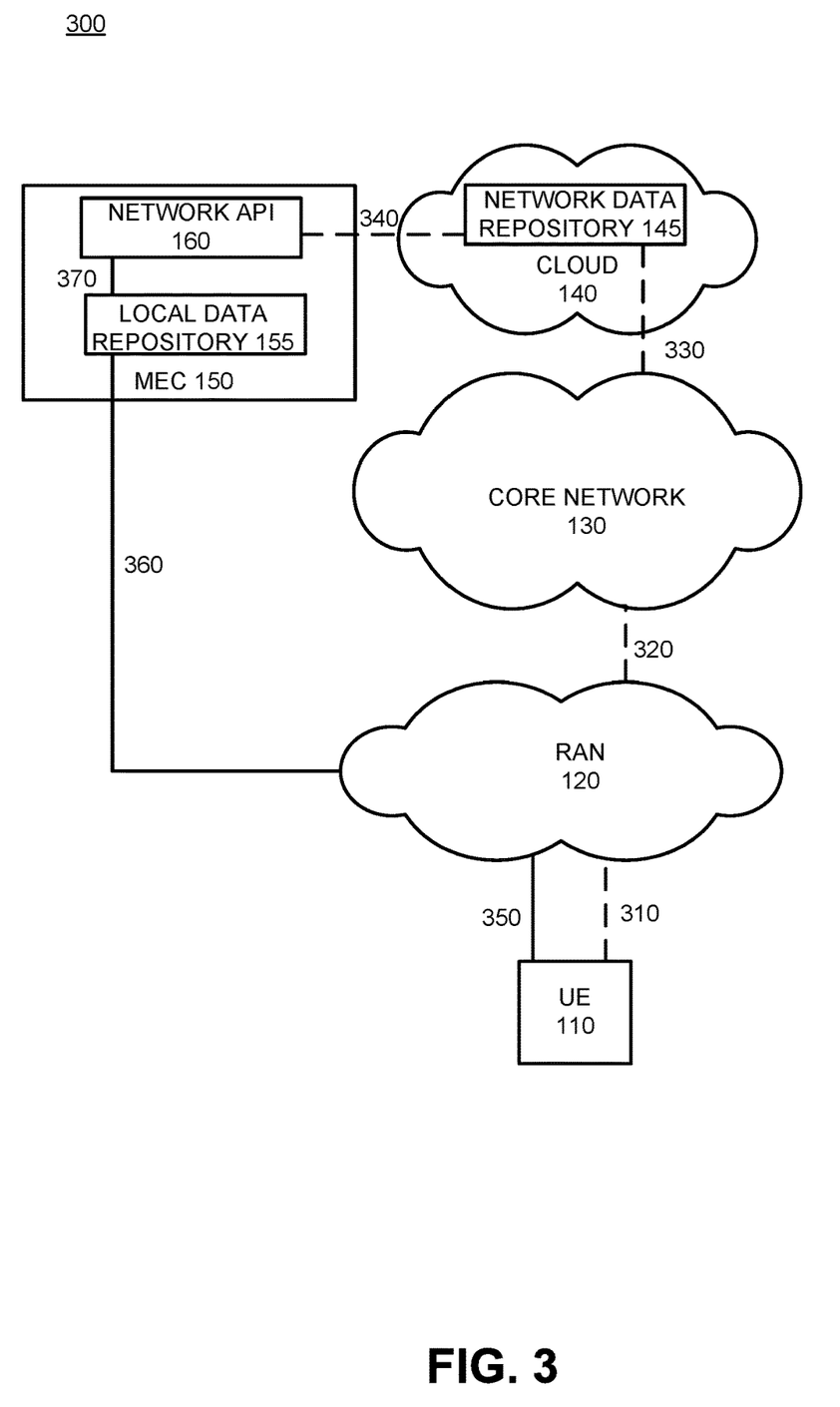
FIG. 3 is a diagram illustrating processes for gathering and storing device information.

FIG. 3 is an exemplary diagram 300 illustrating two methods in which diagnostic or device data associated with UE 110 may be gathered by MEC 150. As shown in FIG. 3, the first method, represented by dashed lines, illustrates a manner in which device data is gathered by MEC 150 via core network 130 and cloud 140. The second method, represented by solid lines, illustrates a method in which UE 110 sends device network information to MEC 150.

As shown in FIG. 3, device data may be sent from UE 110 to RAN 120 (310). The device data may include diagnostic data, device network information, Radio Network Information Service (RNIS) data, and/or additional device data to monitor. For example, the device data may include device location, Radio Signal Strength Indicator (RSSI) information, signal-to-noise ratio, throughput information, etc. Continuing with FIG. 3, the device data may be passed from RAN 120 to core network 130 (320) and stored in network data repository 145 of cloud 140 (330). Cloud 140 may be associated with a wireless service provider. After the device data has been stored in network data repository 145, the device data may be processed and passed to MEC 150 (340). At this point, MEC 150 may extract necessary information and provide a network API as a guide or to create optimized services for UE 110.

Network data repository 145 may pool data from many sources, including UEs 110, components of core network 130, and other systems that access RAN 120 or core network 130. In addition to storing a vast amount of information, the gathered information may be processed (e.g., matched based on source or processed in another way) and relevant information may be extracted. Since the amount of information stored and processed by cloud 140 is so large, it may take a long time for MEC 150 to receive the device information (i.e., a few minutes, an hour, or more). Because applications accessing MEC 150 require low latency and MEC 150 requires device data in real-time or near real-time in order to optimize services, it may be inefficient to pass device information through cloud 140 prior to gathering the information in MEC 150.

Referring back to FIG. 3, in the second method, device data may be passed from UE 110 to RAN 120 (350). The device information may include network device information, device location, RNIS information, and/or other information requested by MEC 150 for optimizing services associated with MEC applications running on UE 110. From RAN 120, the device data may be passed directly to MEC 150 to be stored in local data repository 155 (360). From the local data repository 155, the device data may be exposed via network API 160 to the services that require the information (370). For example, the device information may be used to manage services on MEC 150 to increase performance, optimize existing services, create new services, or used by application vendors and services that subscribe to a data gathering service to ensure that their performance is meeting expectations. Because the device data is passed from UE 110 to MEC 150 without being passed through cloud 140, the latency is low and the data may be gathered and processed in real-time or near real-time. In this way, device conditions can be taken into account and actions can be taken to ensure higher performance for MEC applications and greater customer satisfaction.

Figure 4:
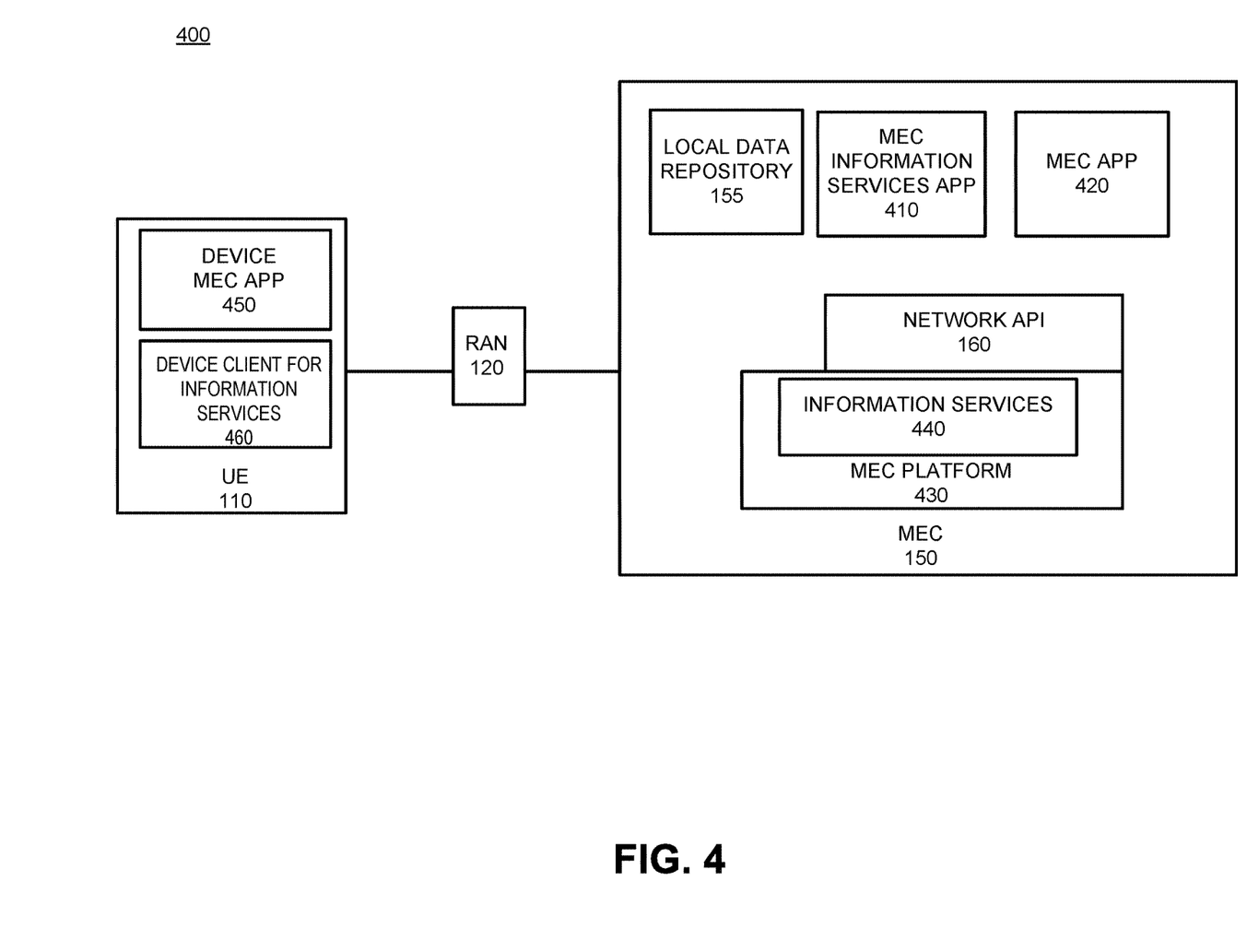
FIG. 4 is a diagram illustrating an exemplary environment associated with one of the processes of FIG. 3.

FIG. 4 is a diagram of an exemplary system 400 for aggregating device data in MEC 150 directly from UE 110. System 400 may include UE 110, RAN 120, and MEC 150. UE 110 may store Device MEC Application (App) 450 and Device Client for Information Services 460. MEC 150 may store MEC Information Services App 410, MEC App 420, MEC Platform 430, and Information Services 440.

As shown in FIG. 4, MEC 150 may store MEC Platform 430, which may include Information Services 440. Information Services 440 may provide, via MEC Information Services App 410, device information, network information, and other diagnostic information to MEC applications, such as MEC App 420, that subscribe to Information Services 440. MEC Information Services App 410 may be resident within MEC 150 on a permanent basis and may be activated when MEC 150 becomes up and running.

MEC App 420 may use the information provided by MEC Information Services App 410 to optimize performance for UEs 110 utilizing MEC App 420. MEC App 420 may be a non-resident application that may be instantiated on MEC 150 the first time the services of MEC App 420 are needed. MEC App 420 may be deactivated or removed from MEC 150 when the services provided by MEC App 420 are no longer needed or being used by devices. MEC App 420 may subscribe to Information Services 440 in order to receive device information associated with UEs 110 using services provided by MEC App 420. For example, in order to optimize performance of MEC App 420 on UE 110, it may be beneficial to gather diagnostics, network information, and other information about UE 110. Information such as device location, RSSI information, signal-to-noise ratio, and additional information may be used to optimize performance of MEC App 420. Therefore, MEC App 420 may subscribe to Information Services 440 in order to gather and analyze data associated with UEs 110 running MEC App 420.

When MEC App 420 is first onboarded and instantiated on MEC 150, MEC App 420 may subscribe to Information Services 440, which may create an interface between MEC App 420 and Information Services 440. The interface may allow MEC App 420 to read device data associated with UEs 110 into local data repository 155. In addition, MEC App 420 may subscribe to a policy associated with conditions for which MEC App 420 should be alerted. For example, MEC App 420 may subscribe to a policy that indicates that MEC App 420 should be alerted when the RSSI value of a connected UE 110 is low or when the signal-to-noise ratio is high. As another example, MEC App 420 may subscribe to a policy that indicates that MEC App 420 should receive device information at a regular interval (e.g., about every two seconds, every 30 seconds, every minute, etc.) in order to monitor device performance on the network and deliver latency improvement plans. MEC App 420 may set the policy based on a profile policy that is transmitted to Information Services 440 when MEC App 420 subscribes to Information Services 440.

When conditions of the policy are met for UE 110 (e.g., the RSSI value is below a first threshold or the signal-to-noise ratio is above a second threshold), Information Services 440 may trigger an alert to be transmitted to MEC App 420. The alert may indicate that the conditions have been met and may further indicate particular rules to use to determine what actions to take in order to remedy the situation. For example, if the device information indicates that the RSSI value for UE 110 is above a threshold, the rule may indicate that the frame rate should be reduced so that UE 110 does not enter into a buffering scenario. The rules may be included in the profile policy associated with MEC App 420.

Before device data for UE 110 can be gathered, UE 110 may register to use MEC App 420. When UE 110 initially registers or becomes onboarded to use MEC App 420, UE 110 may download Device MEC App 450. MEC Information Services App 410 may then be triggered to inform Device MEC App 450 that MEC App 420 is subscribed to Information Services 440 and may instruct UE 110 to download and install Device Client for Information Services 460 onto UE 110. Device Client for Information Service 460 may report network metrics and device data for UE 110 to MEC 150 when UE 110 is running Device MEC App 450. The connection between Device Client for Information Services 460 and MEC 150 may be separate from the connection between Device MEC App 450 and MEC 150.

Once Device Client for Information Service 460 has been installed on UE 110, Device Client for Information Service 460 may register with Information Services 440 using an application identifier (ID). The application ID may be used to match UE 110 and data associated with UE 110 with the application associated with the application ID (e.g., MEC App 420). In addition, the application ID may be used to provide security and privacy for UE 110. For example, when device data for UE 110 is stored in local data repository 155 with a corresponding application ID, only applications authorized to access the application ID may be able to access and/or subscribe to the information associated with the application ID. Therefore, the application ID may prevent unauthorized entities from accessing data associated with UE 110. Additionally, the application ID may help MEC App 420 to parse device data in local data repository 155 to easily gather data for UEs 110 using MEC app 420. For example, MEC App 420 may be able to easily search local data repository 155 using the application ID for MEC App 420 to get the current performance data for all UEs 110 using MEC App 420.

Information Services 440 may then send UE 110 an application profile or policy, which may be instantiated within Device Client for Information Services 460. The application profile or policy may include information policy subscribed to by MEC app 420. For example, the application profile or policy may indicate metrics or device data to gather, a frequency that the information should be gathered, and/or alerts and alert levels. Based on the received application profile or policy, the device data, network data, and other diagnostic data may be sent from UE 110 to MEC 150 and stored in local data repository 155 along with the application ID. MEC App 420 may access the device data using the corresponding application ID in order to optimize services or create new services for UE 110.

Because a connection exists between Device Client for Information Service 460 on UE 110 and MEC 150, MEC 150 may receive device data for UE 110 in real-time or near real-time. In this way, MEC App 420 may be able to gather device and network information for UE 110 quickly enough to apply policy rules and make corrections before UE 110 experiences a degradation in quality of service. Since MEC applications may require low latency, the ability to gather data in an extremely short period of time may be essential for optimizing performance and ensuring that the MEC applications meet performance expectations.

Figure 5:
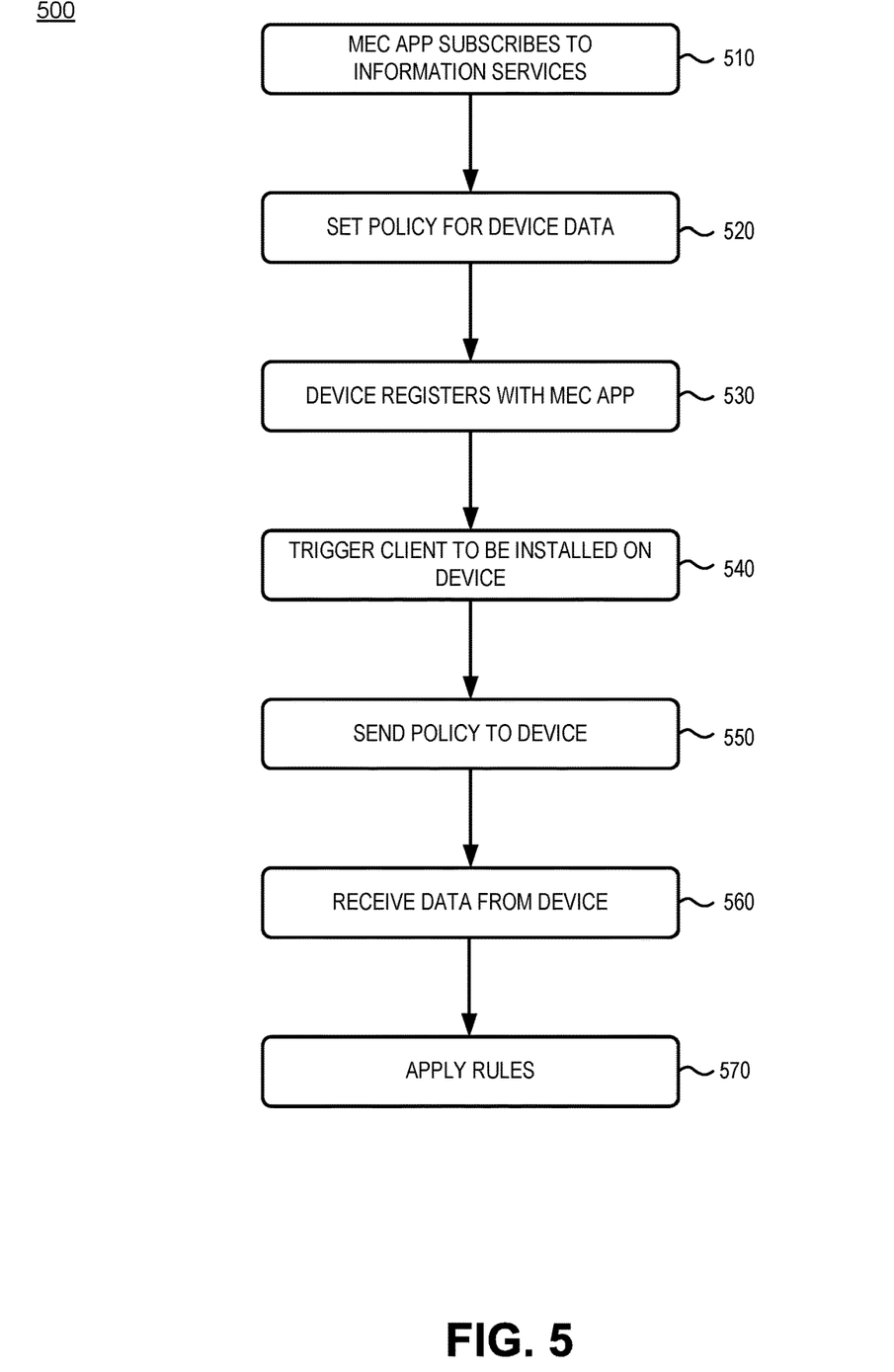
FIG. 5 is a flow chart of an exemplary process in which device information may be gathered and used to optimize MEC services.

FIG. 5 illustrates an exemplary method 500 for gathering device data for MEC applications. Method 500 may be performed by components of MEC 150, such as MEC Information Services App 410 and/or MEC App 420.

Method 500 may begin when MEC App 420 subscribes to Information Services 440 and an interface is created between MEC App 420 and Information Services 440 (block 510). For example, MEC App 420 may be onboarded and instantiated on MEC 150 and MEC App 420 may subscribe to Information Services 440 to receive real-time device information from UEs 110 via the interface.

After MEC App 420 subscribes to Information Services 440, MEC App 420 may set a policy associated with receiving device data from UEs 110 (block 520). In one implementation, the policy may indicate the type of data to be collected from UEs 110 and a frequency with which the data is to be collected. For example, the policy may indicate that RNIS data, network data, device location, RSSI data, signal-to-noise ratio data, throughput data, and/or other data should be collected from UEs 110. In one implementation, MEC App 420 may set a policy indicating that device data should be received on a periodic basis (e.g., every two seconds, every 10 seconds, every minute, etc.) in order to monitor the performance of MEC App 420. In another implementation, the policy may indicate that MEC App 420 should receive alerts only under certain conditions. For example, the policy may indicate that MEC App 420 should receive alerts when an RSSI value of UE 110 is below a first threshold or when a signal-to-noise ratio is above a second threshold.

In some implementations, the policy may further indicate actions to take based on receiving the data or an alert. For example, the policy may indicate that if MEC App 420 was performing data streaming and UE 110 running Device MEC App 450 moved to a location with limited network coverage, MEC App 420 should reduce the frame rate to avoid buffering while still supporting the user.

Method 500 may continue by receiving an indication that UE 110 has registered to use MEC App 420 (block 530). For example, UE 110 may download Device MEC App 450 and register with MEC App 420. In response to receiving the indication that UE 110 has registered to use MEC App 420, MEC Information Services App 410 may inform UE 110 to download and install Device Client for Information Services 460 (block 540). For example, when UE 110 is onboarded onto MEC 150, MEC Information Services App 410 may trigger Device Client for Information Services 460 to be downloaded to UE 110. In one implementation, when the Device Client for Information Services 460 is installed on UE 110, a connection may be formed between Device Client for Information Services 460 on UE 110 and MEC Information Services App 410 on MEC 150 for reporting device data.

In addition, MEC Information Services App 410 may send UE 110 a policy for collecting device data for UE 110 (block 550). For example, MEC Information Services App 410 may send Device Client for Information Services 460 the policy associated with MEC App 420 that indicates the type of data to be collected from UE 110 and a frequency with which the data is to be collected. In this way, Device Client for Information Services 460 may be able to gather the necessary diagnostic information and send the information to MEC 150 based on a policy set by MEC App 420.

Method 500 may continue by receiving device data from UE 110 (block 560). The device data may be received based on the policy set by MEC App 420. For example, Device Client for Information Services 460 may send device data to MEC 150 based on the type and frequency of data indicated in the policy and the device data may be stored in local data repository 155. In addition, an application ID associated with MEC App 420 may be stored with the device data in local data repository 155. In this way, MEC App 420 may be able to easily identify the information to which it has subscribed and may be able to quickly gather the information for analysis. In addition, storing the application ID with the device information may prevent unauthorized MEC applications from accessing the device information.

Method 500 may continue by applying rules to UE 110 based on the received data (block 570). In one implementation, MEC App 420 may apply rules to UE 110 based on policy information. For example, MEC App 420 may reduce a frame rate to avoid buffering based on receiving RSSI information from UE 110.

The device information gathered from UEs 110 may additionally be used by MEC 150 for optimizing device performance. For example, based on receiving a new device location for UE 110, MEC 150 may determine that another MEC location may better service UE 110. As another example, Information Services 440 may identify a number of UEs connected to MEC App 420 and may determine whether another instance or additional computing resources are needed to service customers.

The method described above with regard to FIG. 5 may allow MEC applications to meet radio and network data demands by enabling devices that are registered to utilize the MEC applications to send radio and network layer information to the MEC on a separate connection once the application is instantiated. Instead of being routed through the core network and stored on an operator's data network or cloud, the data may be stored locally in a data repository on the MEC. Since a connection is formed between the devices and the MEC, the data may be received and stored in real-time or near real-time. This data may be short lived as it would only be used to support real time use cases, which may allow the storage limits needed on the local instance to remain low. For example, the data may be stored on a first-in, first-out basis and may not be stored in the local data repository for long periods of time. In addition, the data may additionally be stored in a data repository on the operator's data network or cloud for later processing or to store historically.

Because the data may be received in real-time or near real-time, the data may provide useful information to the MEC and to MEC applications for optimizing performance of the MEC and MEC applications. In addition, the data may allow MEC applications to adjust parameters to increase quality of service for low latency services provided by the MEC applications. In addition, the method described above with respect to FIG. 5 may provide useful information to many different types of MEC applications. Because the MEC applications may be able to set a policy with regard to the type of data and the frequency of data collected, the method may be used by different types of MEC applications that require different types of metrics to meet performance expectations.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, and a series of signal flows/messages have been described with respect to FIG. 3, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, at a multi-access edge computing (MEC) platform, an indication that a user device has downloaded a first client associated with a MEC application and registered for use of the MEC application;
   setting, by the MEC platform, a policy that indicates device information to be obtained from the user device related to the use of the MEC application, wherein the device information includes a first type of data for which first collection is to be performed at an identified frequency, and a second type of data for which second collection is to be performed responsive to observed radio conditions, and wherein the observed radio conditions include radio signal strength indicator (RSSI) data values below a first threshold and signal-to-noise ratio (SNR) data values above a second threshold;
   sending, by the MEC platform and to the user device, instructions to install a second client for an information service, wherein the second client for the information service collects the device information, associated with use of the MEC application by the user device, according to the policy;
   receiving, at the MEC platform, the device information associated with the user device; and
   determining, by the MEC platform, and based on the received device information, performance information associated with the MEC application.

2. The method of claim 1, further comprising:
   receiving an indication that the MEC application has subscribed to the information service.

3. The method of claim 1, wherein the second type of data further includes radio network information services (RNIS) data.

4. The method of claim 1, further comprising:
   sending, to the user device, the policy to configure the collection by the MEC application.

5. The method of claim 1, wherein the policy further indicates rules to apply to the user device based on the performance information associated with the MEC application, and wherein the method further comprises:
   applying the rules, based on the performance information associated with the MEC application, to reduce a frame rate of data traffic associated with the MEC application.

6. The method of claim 1, wherein the device information includes radio network information.

7. The method of claim 1, further comprising:
   storing the device information in a repository on the MEC platform.

8. A system comprising:
   a memory configured to store instructions; and
   a processor configured to execute the instructions to:
      receive an indication that a user device has downloaded a client associated with a multi-access edge computing (MEC) application and registered for use of the MEC application via a MEC platform;
      set a policy that indicates device information to be obtained from the user device related to the use of the MEC application, wherein the device information includes a first type of data for which first collection is to be performed at an identified frequency, and a second type of data for which second collection is to be performed responsive to observed radio conditions, and wherein the observed radio conditions include radio signal strength indicator (RSSI) data values below a first threshold and signal-to-noise ratio (SNR) data values above a second threshold;
      send, to the user device, instructions to install a second client for an information service, wherein the second client for the information service collects the device information, associated with the use of the MEC application by the user device, according to the policy;
      receive the device information associated with the user device; and
      determine, based on the received device information, performance information associated with the MEC application.

9. The system of claim 8, wherein the processor is further configured to:
   receive an indication that the MEC application has subscribed to the information service.

10. The system of claim 8, wherein the second type of data further includes radio network information services (RNIS) data.

11. The system of claim 8, wherein the processor is further configured to execute the instructions to:
    send, to the user device, the policy to configure the collection by the MEC application.

12. The system of claim 8, wherein the policy further indicates rules to apply to the user device based on the performance information associated with the MEC application, and wherein the processor is further configured to execute the instructions to:
apply the rules to the user device, based on the performance information associated with the MEC application, to reduce a frame rate of data traffic associated with the MEC application.

13. The system of claim 8, wherein the system includes a MEC platform.

14. The system of claim 8, wherein the system further comprises a data repository and wherein the processor further executes the instructions to:
store the device information in the data repository.

15. A non-transitory computer-readable medium storing instructions executable by one or more processors, the instructions comprising:
receiving an indication that a user device has downloaded a first client associated with a multi-access edge computing (MEC) application and registered for use of the MEC application via a MEC platform;
setting a policy that indicates device information to be obtained from the user device related to the use of the MEC application, wherein the device information includes a first type of data for which first collection is to be performed at an identified frequency, and a second type of data for which second collection is to be performed responsive to observed radio conditions, and wherein the observed radio conditions include radio signal strength indicator (RSSI) data values below a first threshold and signal-to-noise ratio (SNR) data values above a second threshold;
sending, to the user device, instructions to install a device client for an information service, wherein the device client for the information service collects the device information, associated with the use of the MEC application by the user device, according to the policy;
receiving, at the MEC platform, the device information associated with the user device; and
determining, based on the received device information, performance information associated with the MEC application.

16. The non-transitory computer-readable medium of claim 15, wherein the instructions further comprise:
receiving an indication that the MEC application has subscribed to the information service.

17. The non-transitory computer-readable medium of claim 15, wherein the second type of data further includes radio network information services (RNIS) data.

18. The non-transitory computer-readable medium of claim 15, wherein the instructions further comprise:
sending, to the user device, the policy to configure the collection by the MEC application.

19. The non-transitory computer-readable medium of claim 15, wherein the policy further indicates rules to apply to the user device based on the performance information associated with the MEC application, and wherein the instructions further comprise applying the rules to the user device, based on the performance information associated with the MEC application, to reduce a frame rate of data traffic associated with the MEC application.

20. The non-transitory computer-readable medium of claim 15, wherein the instructions further comprise storing the device information in a repository associated with the MEC platform.

* * * * *